United States Patent
Shen et al.

(10) Patent No.: US 11,323,411 B2
(45) Date of Patent: May 3, 2022

(54) METHOD AND SYSTEM FOR SCHEDULING EDGE CDN NODE

(71) Applicant: Wangsu Science & Technology Co., Ltd., Shanghai (CN)

(72) Inventors: Jianfa Shen, Shanghai (CN); Zongjie Wang, Shanghai (CN); Rongli Niu, Shanghai (CN)

(73) Assignee: Wangsu Science & Technology Co., Ltd., Shanghai (CN)

( * ) Notice: Subject to any disclaimer, the term of this patent is extended or adjusted under 35 U.S.C. 154(b) by 0 days.

(21) Appl. No.: 17/061,490

(22) Filed: Oct. 1, 2020

(65) Prior Publication Data
US 2021/0058363 A1     Feb. 25, 2021

Related U.S. Application Data

(63) Continuation of application No. PCT/CN2020/079349, filed on Mar. 13, 2020.

(30) Foreign Application Priority Data

Aug. 22, 2019 (CN) .......................... 201910780315.5

(51) Int. Cl.
*H04L 29/12* (2006.01)
*H04L 29/08* (2006.01)
(Continued)

(52) U.S. Cl.
CPC .......... *H04L 61/1511* (2013.01); *H04L 67/02* (2013.01); *H04L 67/18* (2013.01); *H04L 67/2842* (2013.01)

(58) Field of Classification Search
USPC ................ 709/245, 227, 223, 219, 226, 212
See application file for complete search history.

(56) References Cited

U.S. PATENT DOCUMENTS

7,797,426 B1 * 9/2010 Lyon ....................... H04L 67/32
709/226
9,220,051 B2 * 12/2015 Damola ............ H04L 29/12433
(Continued)

FOREIGN PATENT DOCUMENTS

CN     106131229 A     11/2016
CN     107071091 A      8/2017
(Continued)

OTHER PUBLICATIONS

Wangsu Science & Technology Co., Ltd., (CN) First Office Action, CN201910780315.5, dated Apr. 1, 2021, 58 pgs.
(Continued)

*Primary Examiner* — Jude Jean Gilles
(74) *Attorney, Agent, or Firm* — USCH Law, PC

(57) ABSTRACT

The present disclosure is related to the content delivery technology and discloses a method and system for scheduling an edge CDN node. The method is applicable to a CDN scheduling center under a 5G network architecture and includes: receiving a terminal request for a target domain name sent by a central layer UPF network element; assigning a target edge CDN node to a terminal according to location information of the terminal carried in the terminal request if the terminal request is an HTTPDNS request; and assigning the target edge CDN node to the terminal according to a source IP address of the terminal request if the terminal request is a conventional DNS request. By adopting the present disclosure, the CDN scheduling center may determine the location information of the terminal under the 5G network architecture, thereby accurately assigning the edge CDN node to the terminal.

20 Claims, 4 Drawing Sheets

(51) Int. Cl.
  *H04L 61/4511* (2022.01)
  *H04L 67/568* (2022.01)
  *H04L 67/52* (2022.01)
  *H04L 67/02* (2022.01)

(56) References Cited

U.S. PATENT DOCUMENTS

| | | | |
|---|---|---|---|
| 9,912,631 B2* | 3/2018 | Bergman | H04L 65/60 |
| 10,027,527 B2* | 7/2018 | Mas Ivars | H04L 29/06476 |
| 2014/0156822 A1* | 6/2014 | Choi | H04L 61/303 709/223 |
| 2015/0032846 A1* | 1/2015 | Doken | H04W 4/60 709/217 |
| 2016/0043990 A1 | 2/2016 | Kagan | |
| 2018/0131606 A1* | 5/2018 | Bergman | H04L 43/16 |
| 2018/0219912 A1 | 8/2018 | Maslak et al. | |
| 2018/0331997 A1* | 11/2018 | Mo | H04L 67/2814 |
| 2019/0166210 A1* | 5/2019 | Froger | H04L 67/18 |
| 2021/0119962 A1* | 4/2021 | Ramia | H04L 65/80 |

FOREIGN PATENT DOCUMENTS

| | | |
|---|---|---|
| CN | 108574744 A | 9/2018 |
| CN | 109257451 A | 1/2019 |
| CN | 109413000 A | 3/2019 |
| CN | 109640319 A | 4/2019 |
| CN | 109831511 A | 5/2019 |
| CN | 110098947 A | 8/2019 |
| CN | 110535930 A | 12/2019 |
| CN | 110572377 A | 12/2019 |
| WO | 2017194861 A1 | 11/2017 |
| WO | 2018112759 A1 | 6/2018 |

OTHER PUBLICATIONS

Wangsu Science & Technology Co., Ltd., International Search Report, PCT/CN2020/079349, dated Jun. 15, 2020, 4 pgs.
3$^{rd}$ Generation Partnership Project, "Technical Specification Group Services and System Aspects; 5G enhanced Mobile Broadband; Media Distribution (Release 15)," Technical Specification, *3GPP*, TR 26.891, V0.0.1, Jun. 30, 2017, 10 pgs.
3$^{rd}$ Generation Partnership Project, "Technical Specification Group Services and System Aspects; 5G enhanced Mobile Broadband; Media Distribution (Release 15)," Technical Specification, *3GPP*, TR26.891, V1.0.04,1, Mar. 11, 2018, 49 pgs.
International Search Report, PCT/CN2020/079349, dated Aug. 22, 2019, 4 pgs.
Wangsu Science & Technology Co., Ltd., Extended European Search Report, EP 20775151.2, dated Jul. 22, 2021, 8 pgs.
Wangsu Science & Technology Co., Ltd., CN Second Office Action with English Translation, CN 201910780315.5, dated Dec. 16, 2021, 19 pgs.
Hpoenixf, "CDN and DNS knowledge summary," https://segmentfault.com/a/1190000014407824, Apr. 16, 2018, 8 pgs.

* cited by examiner

METHOD AND SYSTEM FOR SCHEDULING EDGE CDN NODE

CROSS REFERENCE TO RELATED APPLICATIONS

The present disclosure is a continuation of PCT Application No. PCT/CN2020/079349, titled "METHOD AND SYSTEM FOR SCHEDULING EDGE CDN NODE," filed Mar. 13, 2020, which claims priority to Chinese patent application No. 201910780315.5, titled "METHOD AND SYSTEM FOR SCHEDULING EDGE CDN NODE," filed on Aug. 22, 2019, each of which is incorporated by reference herein in its entirety.

TECHNICAL FIELD

The present disclosure relates to content delivery technology, in particular to a method and system for scheduling an edge CDN node.

BACKGROUND

A domain name system (DNS) server is a network device configured to convert a domain name into an Internet Protocol (IP) address that may be recognized by the network. A user terminal may access a service server on the Internet by virtue of the domain name through the DNS server. A current content delivery network (CDN) acceleration service is mainly implemented based on DNS scheduling. The DNS server sends a terminal request of the terminal to a CDN scheduling center, so that the CDN scheduling center may assign a nearest CDN node to the terminal.

Specifically, the terminal may send the terminal request for a website domain name to a local domain name system (LocalDNS) server when needing to access a certain website. The LocalDNS server may determine that the website has opened the CDN acceleration service after receiving the terminal request, and then the LocalDNS server may forward the terminal request to the CDN scheduling center. After that, the CDN scheduling center may determine a geographical location of the DNS server according to the IP address of the LocalDNS server, thereby returning the IP address of an edge CDN node near the LocalDNS server to the terminal, so that the terminal may access the above website through the edge CDN node.

During a process of implementing the present disclosure, the inventor finds the following problems in the existing technology. The existing LocalDNS server is generally provided by a network operator, a deployment location of which is relatively centralized, and a DNS hijack is easy to occur. Therefore, it is difficult for the CDN scheduling center to accurately locate a user location according to the LocalDNS server, thus making the scheduling of the edge CDN node inaccurate. Especially in a 5G network scenario, a CDN system may sink near a 5th generation (5G) edge computing node to shorten a time delay of the CDN acceleration service. Therefore, there is an urgent need for a method to accurately position a terminal location and assign the edge CDN node to the terminal in the 5G network.

SUMMARY

In order to solve the problems in the existing technology, embodiments of the present disclosure provide a method and system for scheduling an edge CDN node, and the technical solutions are as follows.

In a first aspect, a method for scheduling an edge CDN node is provided, applied to a CDN scheduling center under a 5G network architecture, including:
  receiving a terminal request for a target domain name sent by a central layer user plane function (UPF) network element;
  assigning a target edge CDN node to a terminal according to a location information of the terminal carried in the terminal request if the terminal request is a Hyper Text Transport Protocol domain name system (HTTPDNS) request; and
  assigning the target edge CDN node to the terminal according to a source IP address of the terminal request if the terminal request is a conventional DNS request.

In a second aspect, a system for scheduling an edge CDN node is provided. The system at least includes a terminal, a central layer UPF network element, a central layer access management function (AMF) network element and a CDN scheduling center that are under a 5G network architecture, where:
  the terminal generates a terminal request for a target domain name and sends the terminal request to the central layer UPF network element;
  if the terminal request carries location information of the terminal, the central layer UPF network element directly sends the terminal request to the CDN scheduling center;
  if the terminal request does not carry the location information of the terminal, the central layer UPF network element acquires the location information of the terminal from the central layer AMF network element, transforms the terminal request based on the location information of the terminal, and sends the terminal request that is transformed to the CDN scheduling center; and
  the CDN scheduling center receives the terminal request, assigns a target edge CDN node to the terminal according to the terminal request, and transmits an access address of the target edge CDN node to the terminal through the central layer UPF network element.

In a third aspect, a CDN scheduling center is provided, including a memory and a processor. The memory stores at least one instruction, at least one program, a code set or an instruction set, and the at least one instruction, the at least one program, the code set or the instruction set are loaded and executed by the processor to perform the method for scheduling the edge CDN node according to the first aspect.

In a fourth aspect, a computer readable storage medium is provided, where the storage medium stores at least one instruction, at least one program, a code set or an instruction set, and the at least one instruction, the at least one program, the code set or the instruction set is loaded and executed by a processor to perform the method for scheduling the edge CDN node according to the first aspect.

The technical solutions provided in the embodiments of the present disclosure have the following beneficial effects. In the embodiments of the present disclosure, the CDN scheduling center receives the terminal request for the target domain name sent by the central layer UPF network element. The target edge CDN node is assigned to the terminal according to the location information of the terminal carried in the terminal request if the terminal request is the HTTPDNS request. The target edge CDN node is assigned to the terminal according to the source IP address of the terminal request if the terminal request is the conventional DNS request. In this way, under the 5G network architecture, the terminal, the central layer UPF network element and the central layer AMF network element cooperate to determine the accurate location information of the terminal, and provide the location information to the CDN scheduling center through a mode of the terminal request, so that the CDN scheduling center may accurately assign the edge CDN node to the terminal according to the location information of the terminal carried in the terminal request or the source IP address of the terminal request under a condition that the CDN system would sink to a 5G edge computing node.

BRIEF DESCRIPTION OF THE DRAWINGS

In order to illustrate the technical solutions in the embodiments of the present disclosure more clearly, the accompanying drawings used in the description of the embodiments are briefly described below. It is apparent that the drawings in the following description are only some embodiments of the present disclosure. For those of ordinary skills in the art, other drawings may also be obtained according to these drawings without any creative work.

DETAILED DESCRIPTION

In order to make objectives, technical solutions and advantages of the present disclosure clearer, the embodiments of the present disclosure will be described in details below with reference to the accompanying drawings.

Figure 1:
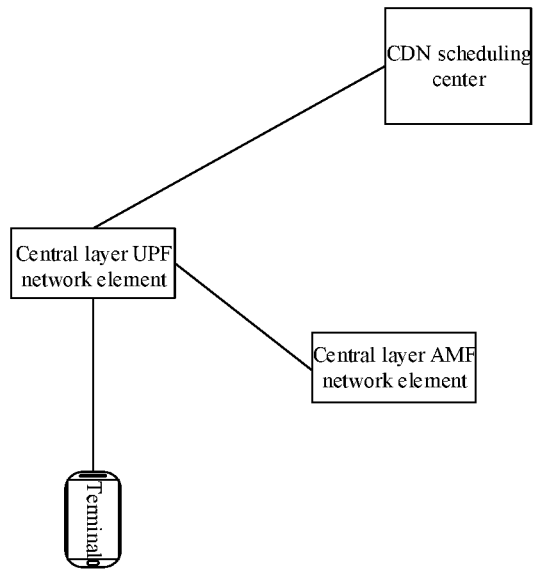
FIG. 1 is a simple schematic diagram of a 5G network architecture provided in an embodiment of the present disclosure.

An embodiment of the present disclosure provides a method for scheduling an edge CDN node. The method is applied to a 5G network architecture and is implemented by a CDN scheduling center under the 5G network architecture. As shown in FIG. 1, the 5G network architecture at least includes a terminal, a central layer user plane function (UPF) network element, a central layer access and mobility function (AMF) network element and the CDN scheduling center. Herein, the terminal may be any communication device connected to a 5G network, specifically may be a conventional communication device such as a mobile phone, a tablet, a computer and the like, and may also be an intelligent household appliance, an enterprise equipment, a public facility and the like that are configured with a communication function and having website access requirements. The central layer UPF network element and the central layer AMF network element may be network element devices deployed at a central layer by a network operator. The central layer UPF network element may be used to realize a processing on a user plane in a 5G network scenario, such as a routing and forwarding of a data packet. The central layer AMF may be used to realize part of the processing on a control plane in the 5G network scenario, such as a location movement of the terminal and a related management of a network access. The CDN scheduling center may be a central management device of a CDN cluster, and is mainly used for scheduling and assigning the edge CDN node for a user terminal in response to a terminal request of the user terminal. For example, the 5G network architecture may further include an edge layer multi-access edge computing (MEC) platform. The edge layer MEC platform may be deployed between a base station and the central layer by the network operator to provide part of the processing on the user plane at an edge side. The CDN cluster may realize an edge node topology of a CDN system by means of deploying the edge CDN node in an equipment room of the edge MEC platform, thus providing the edge CDN node for the user accurately while ensuring the quality of user's domain name access service.

Figure 2:
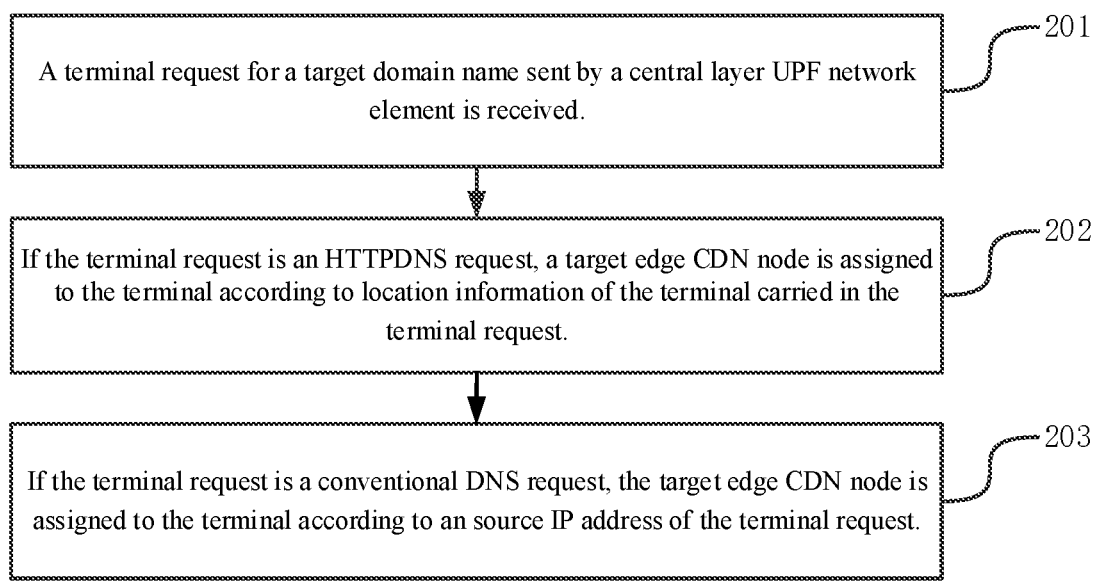
FIG. 2 is a flow chart of a method for scheduling an edge CDN node provided in an embodiment of the present disclosure.

A processing flow shown in FIG. 2 will be described in detail below with reference to specific embodiments, and the content may be as follows.

In step 201, a terminal request for a target domain name sent by a central layer UPF network element is received.

In an implementation, when the user wants to obtain a data resource of a certain domain name through the terminal, taking the target domain name as an example, the user may input the target domain name on the terminal and click an access button, or directly click a jump button of the target domain name on the terminal. Therefore, the terminal may generate the terminal request for the target domain name (which may be understood as a domain name resolution request) and send the terminal request to the central layer UPF network element. After that, the central layer UPF network element may transmit a received terminal request to a CDN scheduling center via a core network and the Internet, so that the CDN scheduling center may receive the terminal request for the target domain name sent by the central layer UPF network element.

It may be understood that the network operator may deploy the central layer in a unit of a geographical region, that is, respectively deploy corresponding central layers in different geographical regions, so that the terminal request of the terminal may be sent to the central layer UPF network element in the corresponding central layer within the geographical region according to the geographical region in which the terminal is located. Similarly, the network operator may further divide the geographical region corresponding to each central layer into sub-regions with a finer granularity, and deploy an edge layer MEC platform in each of the sub-regions separately. The edge layer MEC platform may be provided with an edge layer UPF network element and an edge CDN node. Based on the above deployment, after the terminal sends out the terminal request for the target domain name, the terminal request may reach the central layer UPF network element after sequentially passing through a base station (i.e. an network interface device of the communication device under the 5G network architecture, configured to transfer information between a radio and the terminal in a certain radio coverage area) and the edge layer UPF network element. It should be noted that the terminal request sent by the terminal to the central layer UPF network element here does not mean that a destination IP address of the terminal request is the IP address of the central layer UPF network element, but only indicates that the terminal request may pass through the central layer UPF network element.

In step 202, if the terminal request is an HTTP domain name system (HTTPDNS) request, a target edge CDN node is assigned to the terminal according to location information of the terminal carried in the terminal request.

Herein, the location information at least includes one or more of a base station identifier (ID), a cell ID, a tracking area identifier (TA ID), a location area identifier (LA ID) and a routing area identifier (RA ID) to which the terminal belongs, a data network access identifier (DNAI) of the terminal, and a terminal IP address.

In the implementation, if the terminal request received by the CDN scheduling center is the HTTPDNS request, the CDN scheduling center may read the location information of the terminal carried in the terminal request, and then assign the target edge CDN node to the terminal according to the location information of the terminal. After that, the CDN scheduling center may feed back an access address of the target edge CDN node to the central layer UPF network element through a transmission path of the terminal request. Furthermore, the central layer UPF network element may continue to transmit the access address of the target edge CDN node to the terminal through the edge layer UPF network element. In this way, the terminal may store the access address in association with the target domain name after acquiring the access address of the target edge CDN node, so that the terminal may directly find the access address corresponding to the target domain name through a local cache and directly send a corresponding access request to the access address when needing to access the target domain name later.

In step 203, if the terminal request is a conventional DNS request, the target edge CDN node is assigned to the terminal according to a source IP address of the terminal request.

Herein, the conventional DNS request may be a current mainstream request generated based on a DNS protocol and sent to a DNS server deployed by the network operator for domain name resolution.

In the implementation, if the terminal request received by the CDN scheduling center is the conventional DNS request, the CDN scheduling center may read the source IP address of the terminal request, and then assign the target edge CDN node to the terminal according to the source IP address. After that, the CDN scheduling center may feed back the access address of the target edge CDN node to the central layer UPF network element through the transmission path of the terminal request. Furthermore, the central layer UPF network element may continue to transmit the access address of the target edge CDN node to the terminal through the edge layer UPF network element. In this way, the terminal may store the access address in association with the target domain name after acquiring the access address of the target edge CDN node, so that the terminal may directly find the access address corresponding to the target domain name through the local cache and directly send the corresponding access request to the access address when needing to access the target domain name later.

In an embodiment, the HTTPDNS request received by the CDN scheduling center may be generated based on an HTTP protocol by an application software (APP) with a location information acquisition function on the terminal, and the HTTPDNS request is added with the location information of the terminal.

In the implementation, if a target APP on the terminal needs to acquire the data resource of the target domain name during operation, the access request for the target domain name may be generated based on an operation logic of the target APP. The terminal may first judge whether the target APP has the location information acquisition function after acquiring the access request. The location information acquisition function here may be encapsulated into an installation package of the APP through a specified software development kit (SDK) when an APP provider develops the APP. Through the SDK, the APP may acquire the location information of the terminal at runtime and support the terminal request based on the HTTP protocol, i.e., the HTTPDNS request. Therefore, if the target APP has the location information acquisition function, the terminal may generate the HTTPDNS request for the target domain name and add current location information of the terminal to the HTTPDNS request, and then the terminal may set an destination address of the HTTPDNS request as an HTTPDNS gateway of the CDN scheduling center. It may be understood that a specific access address of the HTTPDNS gateway may also be pre-recorded in the SDK. Next, the terminal may send the HTTPDNS request generated in the above process to the central layer UPF network element. In this way, the HTTPDNS request added with the location information of the terminal is directly generated through simply transforming the APP on the terminal, and the location information of the terminal may be provided to the CDN scheduling center without changing the request during the transmission of the HTTPDNS request, so that the CDN scheduling center may accurately assign the edge CDN node to the terminal.

For example, the central layer UPF network element may detect a communication protocol corresponding to the terminal request after receiving the terminal request of the target domain name sent by the terminal. If the terminal request is the HTTPDNS request, the central layer UPF network element may further detect whether the terminal request carries the location information of the terminal. If the location information of the terminal is carried, the central layer UPF network element may directly forward the terminal request to the CDN scheduling center. In this way, the terminal request may be sent by the central layer UPF network element, and reach the CDN scheduling center after passing through a core network, a firewall and the Internet.

In an embodiment, the HTTPDNS request received by the CDN scheduling center may be generated by transforming the conventional DNS request sent by the terminal based on the location information after the central layer UPF network element acquires the location information of the terminal through a central layer access management function (AMF) network element.

In the implementation, if the target APP on the terminal needs to acquire the data resource of the target domain name during operation, the access request for the target domain name may be generated based on the operation logic of the target APP. The terminal may first judge whether the target APP has the location information acquisition function after acquiring the access request. If the target APP does not have the location information acquisition function, the terminal may generate the conventional DNS request for the target domain name. Next, the terminal may send the conventional DNS request generated in the above process to the central layer UPF network element. After receiving the terminal request for the target domain name sent by the terminal, the central layer UPF network element may access the central layer AMF network element if the terminal request is detected to be the conventional DNS request, so as to acquire the location information of the terminal to which the terminal request belongs stored in the central layer AMF network element. It should be noted that the central layer AMF network element may carry out mobility and access management on the terminal after the terminal accesses the 5G network to communicate with the base station, which includes a processing of locating the terminal, that is, determining the location information of the terminal and locally storing the location information. After that, the central layer UPF network element may transform the terminal request based on the location information, so that a receiver of the terminal request may determine the location information of the terminal according to the transformed terminal request. In this way, the transformed terminal request may be sent out by the central layer UPF network element and reach the CDN scheduling center after passing through the core network, the firewall and the Internet.

For example, after receiving the terminal request for the target domain name sent by the terminal, the central layer UPF network element may further judge whether the target domain name is a CDN service domain name if the terminal request is detected to be the conventional DNS request, that is, whether the target domain name is provisioned with a CDN acceleration service. If so, the central layer UPF network element may acquire the location information of the terminal through the central layer AMF network element and perform subsequent steps; and if not, the central UPF network element may transparently transmit the terminal request directly, that is, continue to transmit the terminal request according to quadruple information of the terminal request.

In an embodiment, the above processing that the central layer UPF network element transforms the conventional DNS request sent by the terminal may specifically be as follows. The central layer UPF network element packages the terminal request into the HTTPDNS request added with the location information of the terminal, and the central layer UPF network element sends the HTTPDNS request to the CDN scheduling center.

In the implementation, after acquiring the location information of the terminal to which the terminal request belongs through the central layer AMF network element, the central layer UPF network element may first package the terminal request into the HTTPDNS request based on the HTTP protocol, and then add the acquired location information of the terminal to the HTTPDNS request. After that, the central layer UPF network element may send the above HTTPDNS request to the HTTPDNS gateway of the CDN scheduling center. It will be understood that the access address of the HTTPDNS gateway of the CDN scheduling center may be pre-stored in the central layer for the central layer UPF network element to call when sending the HTTPDNS request. In this way, a mapping between the terminal and the edge node may be realized through enhancing a message content of the HTTPDNS request, carrying valid location information of the terminal, and cooperating with an edge topology of the CDN system.

In an embodiment, based on the above processing that the central layer UPF network element transforms the conventional DNS request into the HTTPDNS request, the processing of step 202 may be as follows. The target edge CDN node is determined in the edge CDN node corresponding to the target domain name according to the location information of the terminal carried in the terminal request, and the access address of the target edge CDN node is sent to the central layer UPF network element so as to enable the central layer UPF network element to send the access address to the terminal in the form of a DNS resolution result.

In the implementation, the CDN scheduling center may continuously monitor the HTTPDNS gateway, and may read the location information of the terminal and the target domain name carried in the HTTPDNS request after receiving the HTTPDNS request sent by the central layer UPF network element through the HTTPDNS gateway. Next, the CDN scheduling center may first screen the edge CDN node supporting the access acceleration service of the target domain name, and then select the target edge CDN node closest to the terminal from all the screened edge CDN nodes according to the location information of the terminal, and further, the CDN scheduling center may feed back the access address of the target edge CDN node. It is certain that the CDN scheduling center may also first select the edge CDN node according to the location information of the terminal and in order of distance from the terminal from near to far. When the selected edge CDN node supports the access acceleration service of the target domain name, the selected edge CDN node may be determined as the target edge CDN node and the selection may be stopped.

For example, after receiving the access address of the target edge CDN node fed back by the CDN scheduling center, the central layer UPF network element may first determine the terminal request corresponding to this feedback. If the corresponding terminal request is the HTTPDNS request transformed by the central layer UPF network element, the central layer UPF network element may converting the form of the feedback content of the CDN scheduling center, that is, send the access address of the target edge CDN node to the terminal in the form of the DNS resolution result. In this way, since the terminal request sent by the terminal is the conventional DNS request, the terminal may successfully receive and identify the access address in the form of the DNS resolution result. However, if the corresponding terminal request is not transformed by the central layer UPF network element, the central layer UPF network element may send the access address of the target edge CDN node to the terminal in its original form. It should be noted that the central layer UPF network element may determine the correspondence between the feedback content and the terminal request by comparing the quadruple information.

In an embodiment, the conventional DNS request may be received by the CDN scheduling center in the following manner. That is, the central layer UPF network element acquires the location information of the terminal through the central layer AMF network element, and transmits the conventional DNS request sent by the terminal to the target LocalDNS server based on the location information. And the conventional DNS request is forwarded to the CDN scheduling center by the target LocalDNS server.

In the implementation, if the target APP on the terminal needs to acquire the data resource of the target domain name during operation, the access request for the target domain name may be generated based on the operation logic of the target APP. The terminal may first judge whether the target APP has the location information acquisition function after acquiring the access request. If the target APP does not have the location information acquisition function, the terminal may generate the conventional DNS request for the target domain name. Next, the terminal may send the conventional DNS request generated in the above process to the central layer UPF network element. After receiving the terminal request for the target domain name sent by the terminal, the central layer UPF network element may access the central layer AMF network element if the terminal request is detected to be the conventional DNS request, so as to acquire the location information of the terminal to which the terminal request belongs stored in the central layer AMF network element. After that, the central layer UPF network element may determine the target LocalDNS server based on the location information, and then transmit the conventional DNS request to the target LocalDNS server, so that the target LocalDNS server further forwards the conventional DNS request to the CDN scheduling center.

For example, after receiving the terminal request for the target domain name sent by the terminal, the central layer UPF network element may further judge whether the target domain name is the CDN service domain name if the terminal request is detected to be the conventional DNS request, that is, whether the target domain name is provisioned the CDN acceleration service. If so, the central layer UPF network element may acquire the location information of the terminal through the central layer AMF network element and perform subsequent steps; and if not, the central UPF network element may transparently transmit the terminal request directly, that is, continue to transmit the terminal request according to the quadruple information of the terminal request.

In an embodiment, the above processing that the central layer UPF network element transmits the conventional DNS request sent by the terminal to the target LocalDNS server based on the location information may be specifically as follows. The central layer UPF network element determines a target LocalDNS IP address corresponding to the location information of the terminal according to a pre-maintained correspondence between the location information and a LocalDNS IP address, and sets the destination address of the terminal request as the target LocalDNS IP address. The central layer UPF network element sends the terminal request to the target LocalDNS server to which the target LocalDNS IP address is directed, so that the target LocalDNS server forwards the terminal request to the CDN scheduling center.

In the implementation, the central layer UPF network element may maintain the correspondence between the location information and the LocalDNS IP address, in which different LocalDNS IP addresses may correspond to the location information within different regions. Different LocalDNS IP addresses may be IP addresses of physically different DNS servers or multiple IP addresses bound to one DNS server. In this way, after acquiring the location information of the terminal to which the terminal request belongs through the central layer AMF network element, the central layer UPF network element may first determine the target LocalDNS IP address corresponding to the location information of the terminal according to the above correspondence, and set the destination address of the terminal request as the target LocalDNS IP address. Therefore, the central layer UPF network element may deliver the terminal request to the target LocalDNS server to which the target LocalDNS IP address is directed, and the target LocalDNS server implements the subsequent processing of the terminal request. It will be understood that if the target domain name has been provisioned with the CDN acceleration service, the target LocalDNS server may modify the source IP address of the terminal request to a home address after receiving the above terminal request, and then forward the terminal request to the CDN scheduling center.

In an embodiment, based on the above processing that the central layer UPF network element sends the terminal request to the LocalDNS server, the processing in step 203 may specifically be as follows. The source IP address of the terminal request sent by the target LocalDNS server is acquired. The access address of the target edge CDN node corresponding to the source IP address is determined according to the pre-maintained correspondence between the LocalDNS IP address and the access address of the edge CDN node. And the access address of the target edge CDN node is sent to the target LocalDNS server, so that the target LocalDNS server transmits the access address to the terminal through the central layer UPF network element.

In the implementation, the CDN scheduling center may maintain the correspondence between the LocalDNS IP address and the access address of the edge CDN node, in which different LocalDNS IP addresses may correspond to different edge CDN nodes. In this way, after receiving the terminal request sent by the target LocalDNS server, the CDN scheduling center may first acquire the source IP address of the domain name request, and then determine the access address of the target edge CDN node corresponding to the source IP address according to the above correspondence. Furthermore, the CDN scheduling center may feed back the access address of the target edge CDN node to the central layer UPF network element through the target LocalDNS server, and the central layer UPF network element transmits the above access address to the terminal through the edge layer UPF network element. It may be understood that, in the above process, the CDN scheduling system may determine the location information of the terminal through the LocalDNS IP address, so as to assign the edge CDN node which is closer to the terminal location for the terminal to achieve the accurate scheduling of the edge CDN node.

Figure 3:
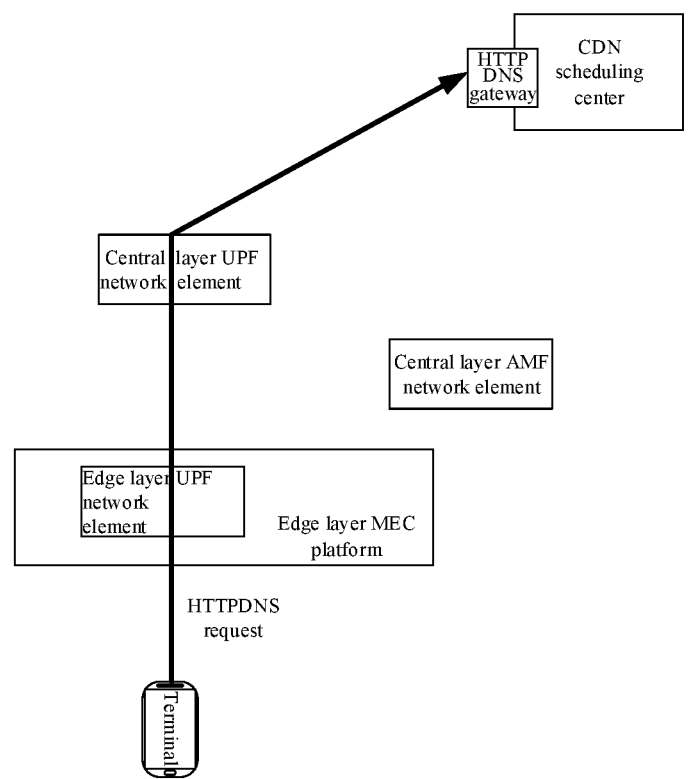
FIG. 3 is a schematic flow chart of scheduling an edge CDN node provided in an embodiment of the present disclosure.
Figure 4:
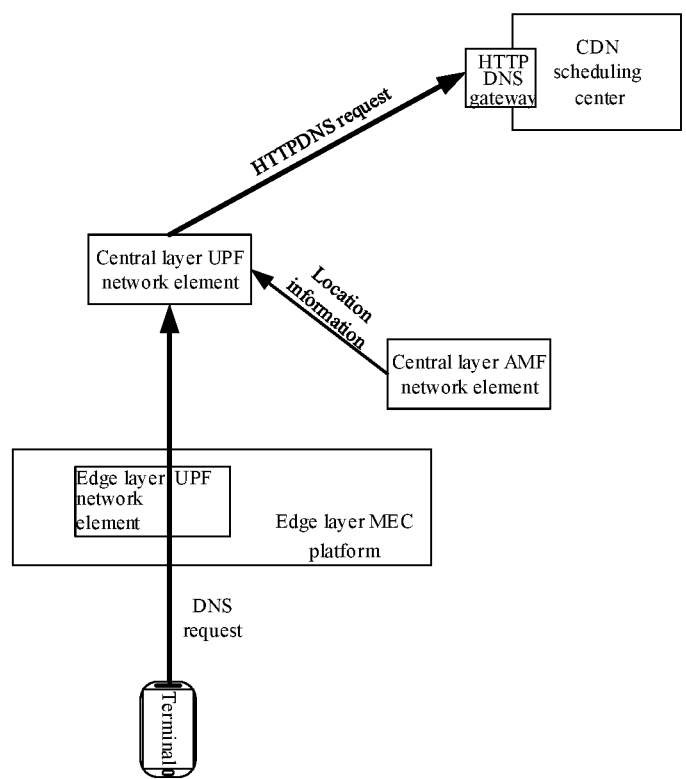
FIG. 4 is another schematic flow chart of scheduling an edge CDN node provided in an embodiment of the present disclosure.
Figure 5:
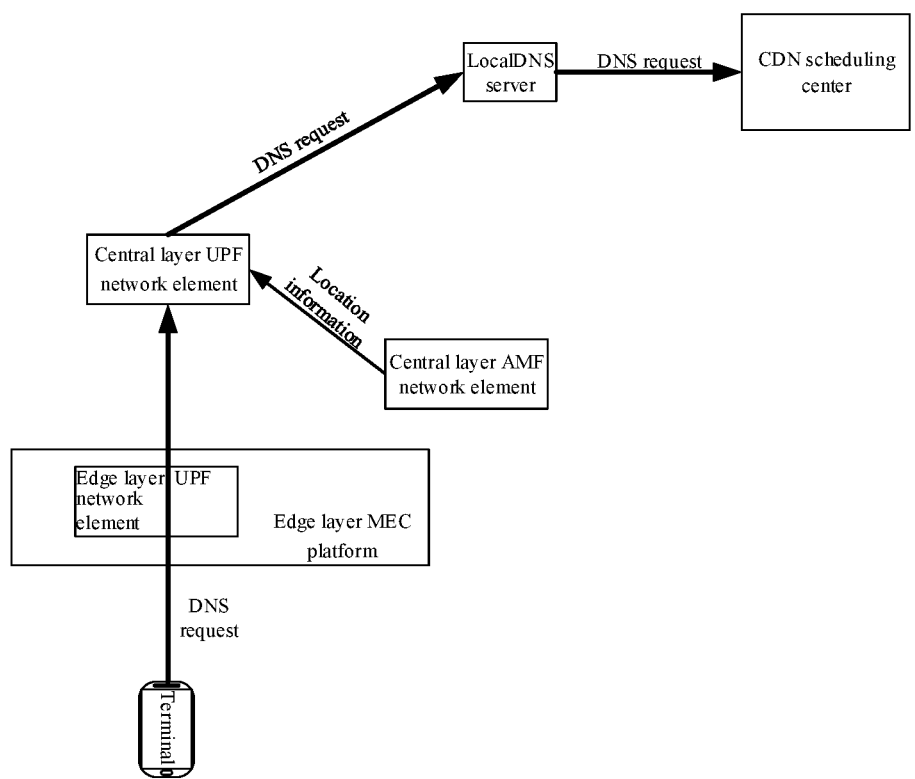
FIG. 5 is still another schematic flow chart of scheduling an edge CDN node provided in an embodiment of the present disclosure.

To sum up, the method for scheduling the edge CDN node disclosed in this embodiment may be divided into three processes, which may be referred to FIG. 3, FIG. 4 and FIG. 5 respectively. The processing processes may be roughly as follows.

As shown in the flow chart of FIG. 3, the terminal generates the HTTPDNS request carrying the terminal location information based on the SDK built in the APP. After that, the terminal may send the HTTPDNS request to the HTTPDNS gateway of the CDN scheduling center through the edge layer UPF network element and the center layer UPF network element. And the CDN scheduling center returns the access address of the target edge CDN node back to the terminal after determining the target edge CDN node according to the location information in the HTTPDNS request. In this way, the APP on the terminal is transformed directly, the terminal request is generated based on the Http protocol and the location information is added to the terminal request, so that the CDN scheduling center may accurately assign the edge CDN node to the terminal directly according to the location information in the terminal request after receiving the terminal request.

As shown in the flow chart of FIG. 4, the terminal generates the DNS request, and the DNS request is transmitted to the central layer UPF network element through the edge layer UPF network element. The central layer UPF network element acquires the location information of the terminal from the central layer AMF network element, and transforms the DNS request into the HTTPDNS request carrying the location information. The central layer UPF network element sends the HTTPDNS request to the HTTPDNS gateway of the CDN scheduling center. And the CDN scheduling center returns the access address of the target edge CDN node back to the terminal after determining the target edge CDN node according to the location information in the HTTPDNS request. In this way, the central layer UPF network element transforms the received terminal request and adds the location information to the transformed terminal request, so that the CDN scheduling center may accurately assign the edge CDN node to the terminal directly according to the location information in the terminal request after receiving the terminal request.

As shown in the flow chart of FIG. 5, the terminal generates the DNS request, and the DNS request is transmitted to the central layer UPF network element through the edge layer UPF network element. The central layer UPF network element acquires the location information of the terminal from the central layer AMF network element and determines the target LocalDNS IP address corresponding to the location information. The central layer UPF network element sends the DNS request to the target LocalDNS server to which the target LocalDNS IP address is directed to. The target LocalDNS server sends the DNS request to the CDN scheduling center. And the CDN scheduling center returns the access address of the target edge CDN node back to the terminal after determining the target edge CDN node according to the source IP address of the DNS request (i.e., the IP address of the target LocalDNS server). In this way, the central layer UPF network element routes the terminal request to the LocalDNS server corresponding to the location information of the terminal according to the location information, and then the LocalDNS server forwards the terminal request to the CDN scheduling center, so that the CDN scheduling center may judge the location information of the terminal according to the IP address of the LocalDNS server after receiving the terminal request, thereby accurately assigning the edge CDN node to the terminal.

In the embodiments of the present disclosure, the CDN scheduling center receives the terminal request for the target domain name sent by the central layer UPF network element. If the terminal request is the HTTPDNS request, the target edge CDN node is assigned to the terminal according to the location information of the terminal carried in the terminal request. If the terminal request is the conventional DNS request, the target edge CDN node is assigned to the terminal according to the source IP address of the terminal request. In this way, under the 5G network architecture, the terminal, the central layer UPF network element and the central layer AMF network element cooperate to determine the accurate location information of the terminal and provide the location information to the CDN scheduling center by means of the terminal request, so that the CDN scheduling center may accurately assign the edge CDN node to the terminal according to the location information of the terminal carried in the terminal request or the source IP address of the terminal request under a condition that the CDN system would sink to a 5G edge computing node.

Based on the same technical concept, an embodiment of the present disclosure further provides a system for scheduling an edge CDN node. The system at least includes a terminal, a central layer UPF network element, a central layer AMF network element and a CDN scheduling center that are under a 5G network architecture, where:

the terminal generates a terminal request for a target domain name and sends the terminal request to the central layer UPF network element;

if the terminal request carries location information of the terminal, the central layer UPF network element directly sends the terminal request to the CDN scheduling center;

if the terminal request does not carry the location information of the terminal, the central layer UPF network element acquires the location information of the terminal from the central layer AMF network element, transforms the terminal request based on the location information of the terminal, and sends the terminal request that is transformed to the CDN scheduling center; and the CDN scheduling center receives the terminal request, assigns a target edge CDN node to the terminal according to the terminal request, and transmits an access address of the target edge CDN node to the terminal through the central layer UPF network element.

Based on the same technical concept, an embodiment of the present disclosure further provides a CDN scheduling center. The CDN scheduling center may have large differences due to different configurations or performances, which includes one or more memories and processors. Herein, the memory may be capable of temporary storage or permanent storage. The memory may store at least one instruction, at least one program, a code set or an instruction set, and the at least one instruction, the at least one program, the code set or the instruction set is loaded and executed by the processor to perform the processing of steps 201 to 203 described above.

Those skilled in the art may understand that all or some steps of the embodiments described above may be completed by hardware, or by a program instructing related hardware, and the program may be stored in a computer readable storage medium. The storage medium described above may be a read only memory, a magnetic disk, an optical disk or the like.

The described above are only preferred embodiments of the present disclosure, which are not intended to limit the present disclosure. Any modifications, equivalent substitutions, improvements or the like made within the spirit and principle of the present disclosure shall be included in the protection scope of the present disclosure.

What is claimed is:

1. A method for scheduling an edge content delivery network (CDN) node, applied to a CDN scheduling center under a 5th generation (5G) network architecture, comprising:

receiving a terminal request for a target domain name sent by a central layer user plane function (UPF) network element;

in response to the terminal request being a Hyper Text Transport Protocol domain name system (HTTPDNS) request, assigning a target edge CDN node to a terminal according to location information of the terminal carried in the terminal request; and in response to the terminal request being a conventional domain name system (DNS) request, assigning the target edge CDN node to the terminal according to a source internet Protocol (IP) address of the terminal request.

2. The method according to claim 1, wherein the HTTPDNS request is generated by an application software (APP) with a location information acquisition function on the terminal based on an HTTP protocol and is added with the location information of the terminal.

3. The method according to claim 1, wherein the HTTPDNS request is generated, based on the location information of the terminal, by the central layer UPF network element transforming the conventional DNS request after obtaining the location information; wherein the conventional DNS request is sent by the terminal, and the location information is obtained by the central layer UPF network element through a central layer access management function (AMF) network element.

4. The method according to claim 3, wherein a processing that the central layer UPF network element transforms the conventional DNS request sent by the terminal comprises:

packaging, by the central layer UPF network element, the terminal request into the HTTPDNS request added with the location information of the terminal; and sending, by the central layer UPF network element, the HTTPDNS request to the CDN scheduling center.

5. The method according to claim 4, wherein assigning the target edge CDN node to the terminal according to the location information of the terminal carried in the terminal request comprises:

determining the target edge CDN node in the edge CDN node corresponding to the target domain name according to the location information of the terminal carried in the terminal request; and sending an access address of the target edge CDN node to the central layer UPF network element so as to enable the central layer UPF network element to send the access address to the terminal in a form of a DNS resolution result.

6. The method according to claim 1, wherein, after obtaining the location information of the terminal through the central layer AMF network element, the central layer UPF network element transmits the conventional DNS request sent by the terminal to a target local domain name system (LocalDNS) server based on the location information, and the conventional DNS request is forwarded to the CDN scheduling center by the target LocalDNS server.

7. The method according to claim 6, wherein a processing that the central layer UPF network element transmits the conventional DNS request sent by the terminal to the target LocalDNS server based on the location information comprises:

determining, by the central layer UPF network element, a target LocalDNS IP address corresponding to the location information of the terminal according to a pre-maintained correspondence between the location information and a LocalDNS IP address, and setting, by the central layer UPF network element, a destination address of the terminal request as the target LocalDNS IP address; and sending, by the central layer UPF network element, the terminal request to the target LocalDNS server to which the target LocalDNS IP address is directed, so as to enable the target LocalDNS server to forward the terminal request to the CDN scheduling center.

8. The method according to claim 7, wherein assigning the target edge CDN node to the terminal according to the source IP address of the terminal request comprises:

acquiring the source IP address of the terminal request sent by the target LocalDNS server;

determining the access address of the target edge CDN node corresponding to the source IP address according to the pre-maintained correspondence between the LocalDNS IP address and the access address of the edge CDN node; and sending the access address of the target edge CDN node to the target LocalDNS server, so as to enable the target LocalDNS server to transmit the access address to the terminal through the central layer UPF network element.

9. The method according to claim 1, wherein the location information at least comprises one or more of a base station identifier (ID), a cell ID, a tracking area identifier (TA ID), a location area identifier (LA ID) and a routing area identifier (RA ID) to which the terminal belongs, a data network access identifier (DNAI) of the terminal, and a terminal IP address.

10. A content delivery network (CDN) scheduling center, wherein the CDN scheduling center comprises a memory and a processor, the memory stores at least one instruction, at least one program, a code set or an instruction set, and the at least one instruction, the at least one program, the code set or the instruction set is loaded and executed by the processor to perform a method for scheduling an edge CDN node; wherein the method comprises:

receiving a terminal request for a target domain name sent by a central layer user plane function (UPF) network element;

in response to the terminal request being a Hyper Text Transport Protocol domain name system (HTTPDNS) request, assigning a target edge CDN node to a terminal according to location information of the terminal carried in the terminal request; and in response to the terminal request being a conventional domain name system (DNS) request, assigning the target edge CDN node to the terminal according to a source internet Protocol (IP) address of the terminal request.

11. The CDN scheduling center according to claim 10, wherein the HTTPDNS request is generated by an application software (APP) with a location information acquisition function on the terminal based on an HTTP protocol and is added with the location information of the terminal.

12. The CDN scheduling center according to claim 10, wherein the HTTPDNS request is generated, based on the location information of the terminal, by the central layer UPF network element transforming the conventional DNS request after obtaining the location information; wherein the conventional DNS request is sent by the terminal, and the location information is obtained by the central layer UPF network element through a central layer access management function (AMF) network element.

13. The CDN scheduling center according to claim 12, wherein a processing that the central layer UPF network element transforms the conventional DNS request sent by the terminal comprises:

packaging, by the central layer UPF network element, the terminal request into the HTTPDNS request added with the location information of the terminal; and sending, by the central layer UPF network element, the HTTPDNS request to the CDN scheduling center.

14. The CDN scheduling center according to claim 13, wherein assigning the target edge CDN node to the terminal according to the location information of the terminal carried in the terminal request comprises:

determining the target edge CDN node in the edge CDN node corresponding to the target domain name according to the location information of the terminal carried in the terminal request; and sending an access address of the target edge CDN node to the central layer UPF network element so as to enable the central layer UPF network element to send the access address to the terminal in a form of a DNS resolution result.

15. The CDN scheduling center according to claim 10, wherein, after obtaining the location information of the terminal through the central layer AMF network element, the central layer UPF network element transmits the conventional DNS request sent by the terminal to a target local domain name system (LocalDNS) server based on the location information, and the conventional DNS request is forwarded to the CDN scheduling center by the target LocalDNS server.

16. The CDN scheduling center according to claim 15, wherein a processing that the central layer UPF network element transmits the conventional DNS request sent by the terminal to the target LocalDNS server based on the location information comprises:

determining, by the central layer UPF network element, a target LocalDNS IP address corresponding to the location information of the terminal according to a pre-maintained correspondence between the location information and a LocalDNS IP address, and setting, by the central layer UPF network element, a destination address of the terminal request as the target LocalDNS IP address; and sending, by the central layer UPF network element, the terminal request to the target LocalDNS server to which the target LocalDNS IP address is directed, so as to enable the target LocalDNS server to forward the terminal request to the CDN scheduling center.

17. The CDN scheduling center according to claim 16, wherein assigning the target edge CDN node to the terminal according to the source IP address of the terminal request comprises:

acquiring the source IP address of the terminal request sent by the target LocalDNS server;

determining the access address of the target edge CDN node corresponding to the source IP address according to the pre-maintained correspondence between the LocalDNS IP address and the access address of the edge CDN node; and sending the access address of the target edge CDN node to the target LocalDNS server, so as to enable the target LocalDNS server to transmit the access address to the terminal through the central layer UPF network element.

18. The CDN scheduling center according to claim 10, wherein the location information at least comprises one or more of a base station identifier (ID), a cell ID, a tracking area identifier (TA ID), a location area identifier (LA ID) and a routing area identifier (RA ID) to which the terminal belongs, a data network access identifier (DNAI) of the terminal, and a terminal IP address.

19. A computer readable storage medium, wherein the storage medium stores at least one instruction, at least one program, a code set or an instruction set, and the at least one instruction, the at least one program, the code set or the instruction set is loaded and executed by a processor to perform a method for scheduling an edge content delivery network (CDN) node; wherein the method comprises:

receiving a terminal request for a target domain name sent by a central layer user plane function (UPF) network element;

in response to the terminal request being a Hyper Text Transport Protocol domain name system (HTTPDNS) request, assigning a target edge CDN node to a terminal according to location information of the terminal carried in the terminal request; and in response to the terminal request being a conventional domain name system (DNS) request, assigning the target edge CDN node to the terminal according to a source IP address of the terminal request.

20. The computer readable storage medium according to claim 19, wherein the HTTPDNS request is generated by an application software (APP) with a location information acquisition function on the terminal based on an HTTP protocol and is added with the location information of the terminal.

* * * * *